United States Patent [19]
Schreurs et al.

[11] Patent Number: 5,465,277
[45] Date of Patent: Nov. 7, 1995

[54] DEVICE FOR THE SYNCHRONIZATION OF DIGITAL DATA BURSTS AND READ APPARATUS COMPRISING THE DEVICE

[75] Inventors: Jacobus C. Schreurs; Rudolf A. Horstman, both of Eindhoven, Netherlands

[73] Assignee: U.S. Philips Corporation, New York, N.Y.

[21] Appl. No.: 651,116

[22] Filed: Feb. 5, 1991

Related U.S. Application Data

[63] Continuation of Ser. No. 395,126, Aug. 17, 1989, abandoned.

[30] Foreign Application Priority Data

Aug. 19, 1988 [FR] France .................................. 88 11034

[51] Int. Cl.$^6$ ...................................................... H03D 3/24
[52] U.S. Cl. ............................................ 375/376; 375/375
[58] Field of Search .............................. 375/81, 82, 119, 375/120; 331/1 A, 11, 25, 117 R, 1 R; 328/63, 72, 133; 329/307, 308

[56] References Cited

U.S. PATENT DOCUMENTS

| | | | |
|---|---|---|---|
| 4,155,050 | 5/1979 | Nichols | 331/17 |
| 4,357,707 | 11/1982 | DeLury | 375/110 |
| 4,594,516 | 12/1986 | Tokumitsu | 307/269 |
| 4,626,913 | 2/1986 | Gurumurthy | 358/147 |
| 4,628,270 | 12/1986 | Roberts | 375/120 |
| 4,694,259 | 9/1987 | Carickoff et al. | 331/1 A |
| 4,787,097 | 11/1988 | Rizzo | 328/155 |
| 4,803,705 | 2/1989 | Gillingham et al. | 375/111 |
| 4,808,884 | 2/1989 | Hull et al. | 375/120 |
| 4,814,719 | 3/1989 | Guyer | 375/120 |

FOREIGN PATENT DOCUMENTS

| | | |
|---|---|---|
| 0120344 | 10/1984 | European Pat. Off. . |
| 2574242 | 6/1986 | France . |
| 3331714 | 3/1985 | Germany . |

OTHER PUBLICATIONS

Schepers et al "An Integrated Multinorm Receiver" Symposium Record Joint Session CBroadcast & TV Symposium, Montreax pp. 181-204 11-17 Jun. 1987.
Hirashima et al "A Circuit Design of Sampling Clock Regeneratation" IEEE Transactions on Consumer Electronics vol. CE-26 No. 3 1980 pp. 657-663.

*Primary Examiner*—Stephen Chin
*Attorney, Agent, or Firm*—Michael E. Marion

[57] ABSTRACT

The invention relates to the synchronization of a local clock (VCO) with a first clock frequency (Fo) equal to that of time-spaced digital data bursts read from a record carrier which also carries a continuous digital signal (H) of a second clock frequency (F). In accordance with the invention, locking to the desired frequency is assured by a frequency comparator (FD) which detects the frequency shift between the signal (S) of the local clock (VCO) and the signal of the second clock frequency (F). The device also comprises a phase-locked loop (PD) which provides phase locking once the synchronization has locked to the correct frequency.

25 Claims, 2 Drawing Sheets

5,465,277

DEVICE FOR THE SYNCHRONIZATION OF DIGITAL DATA BURSTS AND READ APPARATUS COMPRISING THE DEVICE

This is a continuation of application Ser. No. 07/395,126 filed Aug. 17, 1989 abandoned.

BACKGROUND OF THE INVENTION

The invention relates to a device for the synchronization of a local clock signal with time spaced digital data bursts comprised by an information signal, the frequency of the data burst having a given relationship with the frequency of a continuous signal.

The development of digital optical disc technology has led to discs carrying audio and video signals, the audio signals being of the now-conventional Compact Disc (Trade Mark) standard, and the video signals being in particular high definition signals in accordance with the MAC standard, specifically D2-MAC. In accordance with the MAC standard digital data bursts corresponding to the audio channel (or channels) of the video signal are followed by time-multiplexed analog chrominance and luminance signals. To read such a carrier it is necessary to provide a synchronization between a local clock and the digital data bursts of the video signal.

Such a synchronization is not without problems. The frequency spectrum of the corresponding clock not only exhibits a central frequency in the present case 10.125 MHz, which would be the same if the information were present permanently, but also sidebands which are regularly spaced at opposite sides of the central band, in the present case at an interval of 15.625 Hz, and which arise because the information takes the form of spaced-apart bursts.

The rotation of the disc is controlled with a certain accuracy, which manifests itself as a frequency shift of maximum 28 kHz. As a result of this a conventional synchronization control system may lock at random to the desired central frequency as well as to some of the sidebands, in the present case at least four, in which last-mentioned case it will be impossible to recover the information.

SUMMARY OF THE INVENTION

Therefore it is an object of the invention to provide a synchronization device which enables said problem to be solved by providing a synchronization which reliably locks to a desired frequency, even if the frequency spectrum of an information signal contains frequencies close to said desired frequency.

To this end the device in accordance with the invention is therefore characterized in that it comprises:

a frequency comparator for producing at its output a frequency error signal corresponding to the frequency shift of the local clock signal relative to the continuous signal, a phase comparator for producing at its output a phase-error signal which is representative of the phase difference between the local clock signal and the digital data of said information signal and control means for controlling the frequency of the local clock signal as a function of said frequency-error and phase-error signals.

The frequency comparator enables the frequency shift to be detected with an accuracy equal to the minimum shift which can be chosen as a function of the operating parameters. This ensures that the synchronization locks to the correct frequency, provided that the minimum frequency shift is smaller than the difference between the desired synchronization frequency and the nearest frequency in the frequency spectrum of the received signal. When this locking is effected the frequency loop is inoperative and synchronization is maintained by the phase loop only.

In a first embodiment the frequency comparator comprises a counter having a count-down input connected to the output of a local clock for generating the local clock signal and having a control input arranged to receive a first signal derived from the continuous signal.

In a second embodiment the frequency comparator comprises a counter having a count-down input arranged to receive the continuous signal having the second clock frequency, and having a control input arranged to receive a second signal derived from the local clock signal.

Suitably, the counter is constructed in such a way that at the beginning of each count-down cycle a count is obtained at its output, for example the count zero, in the case of a predetermined maximum frequency shift.

For the analog conversion of the counter output the frequency comparator may comprise a sample-and-hold circuit whose input is connected to the output of the counter and whose output supplies the analog frequency error signal, the sample-and-hold circuit suitably takes into account only a given number of least significant bits of the output signal of the counter.

A first low-pass filter may be arranged between the output of the frequency comparator and the input of the control means to remove the residual submultiple-frequency component, which filter can function as the loop filter for the phase-locked loop.

The input of the phase comparator may be connected to a duobinary detector whose input is arranged to receive encoded signals corresponding to the data bursts, an detector producing said information signal at its output.

In a very advantageous embodiment the phase comparator comprises a first and a second flip-flop, the clock input of the second flip-flop being arranged to receive said local clock signal and the clock input of the first flip-flop being arranged to receive said information signal, which second flip-flop constitutes a divide-by-two circuit having an inverting output connected to the data input of the first flip-flop in such a way that the first flip-flop generates output signals whose duty cycle is representative of the phase difference to be measured. In order to obtain the analog phase-error signal the phase comparator may comprise a first and a second exclusive-OR gate, the inputs of the first gate being connected to the non-inverting output of the first flip-flop and to the non-inverting output of the second flip-flop, and the inputs of the second gate being connected to the inverting output of the first flip-flop and to the non-inverting output of the second flip-flop, the outputs of the first and the second gate being connected respectively to the inverting input and the non-inverting input of an amplifier whose output constitutes the output of the phase comparator.

A second low-pass filter and/or an integrator may be arranged between the output of the phase comparator and the corresponding input of the control means.

A filter having two gain levels may be arranged between the output of the adder and the frequency control input of the local clock which filter has a higher gain for very low frequencies to provide compensation for thermal drift of, in particular, the local clock.

In a preferred embodiment the phase comparator is arranged to receive a data-window signal corresponding to the time intervals in which the digital data bursts appear in the information signal in such a way that it is operative only during said time intervals.

The invention also relates to an information read apparatus for reading a disc on which an information signal comprising recurrent and time-spaced digital data bursts with a first clock frequency is recorded and on which a reference signal is recorded with a second clock frequency which is in a given relationship with said first clock frequency, said apparatus comprising means for reading and separately supplying the information signal and the reference signal, said means comprising means for deriving a continuous signal, characterized in that the apparatus comprises a synchronization device as defined in the foregoing, which device comprises a frequency comparator adapted to receive said continuous signal and a phase comparator adapted to receive said information signal.

The information signal may comprise information bursts between the digital data bursts and the read apparatus may comprise a synchronization detector constructed to receive the information signal and to produce at its output at least one data-window signal corresponding to the time intervals in which the data bursts are present, and inhibiting means constructed to receive said window signal and to render the phase detector insensitive to the information bursts, which inhibiting means. in a preferred embodiment, may comprise a phase-detector input arranged to receive said window signal.

The information bursts may be video signals and the synchronization detector may be adapted to produce a separate video line signal and video frame signal at its output. The continuous signal may be a digital audio signal in conformity with the CD standard and the decoding device may be constructed to produce at least a separate analog audio signal at its output.

BRIEF DESCRIPTION OF THE DRAWINGS

Embodiments of the invention will now described in more detail, by way of example, with reference to the accompanying drawings, in which.

DETAILED DESCRIPTION OF THE INVENTION

Figure 1:
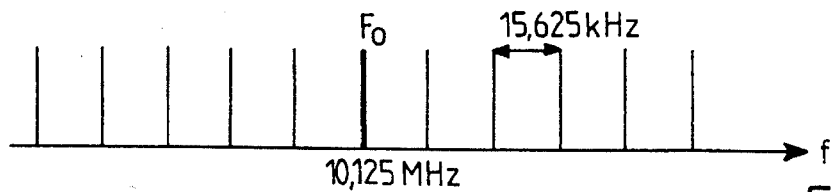
FIG. 1 shows the frequency spectrum for recurrent data bursts in accordance with the D2 MAC system.

In FIG. 1 the digital data bursts of a standard D2 MAC audio signal have a frequency spectrum which is centred about a central frequency Fo of 10.125 MHz with sidebands spaced at n×Δo Hz (n being a positive or negative integer and Δo=15.625 Hz), which sidebands arise because the pulse bursts (total duration of 11 μs) appear at the beginning of each video line and are spaced in time from one another by the time-multiplexed chrominance and luminance signals of said line.

When a D2-MAC signal having a first clock frequency is recorded on a record carrier such as an optical disc, synchronization with a local clock is necessary in order to read the information of the bursts.

The present invention relates, in particular, to the case where the disc also carries a reference signal, specifically a digital signal, having a second clock frequency which has a predetermined relationship with the first clock frequency. This reference signal, from which a continuous signal can be derived, may be a digital signal of the same type as that on a digital audio disc (CD). Thus, a disc may carry an audio recording in conformity with the CD standard and a video recording with one or more audio channels in conformity with the D2-MAC standard.

When such a disc is read the speed of rotation of the disc is controlled, for example, by means of a conventional control system which measures the time error of the line-synchronizing pulses. Such a control system may be of the same type as used for the audio Compact Disc, utilizing said continuous digital signal.

However, if a conventional synchronization loop is used for synchronization, this loop may not only lock to the central frequency Fo but also to one of the sideband frequencies.

In accordance with the PAL Laservision standard the maximum time error of the clock signal of the burst being read is 17.5 μs at 25 Hz.

The disc characteristics contribute 6 μs to this value and the positioning error of the disc produces to the residual 11.5 μs owing to the accuracy of the speed control system.

For a disc whose information area has a radius between 55 and 145 mm and which rotates which a speed of 50 πrad/s, the inaccuracy of the nominal clock frequency Fo of the bursts will therefore be: $\Delta Fo=\pm 28$ kHz.

In the above case, where the central frequency $F_o$ is 10.125 MHz and the sidebands are spaced at n×15.625 KHz, it follows that a conventional synchronization control system may lock not only to the central frequency $F_o$ but also to at least two sidebands at either side of this central frequency, i.e. at least to five possible frequencies, of which only one frequency is correct.

The basic idea of the invention is to eliminate this ambiguity by utilizing the continuously available signal.

Figure 2:
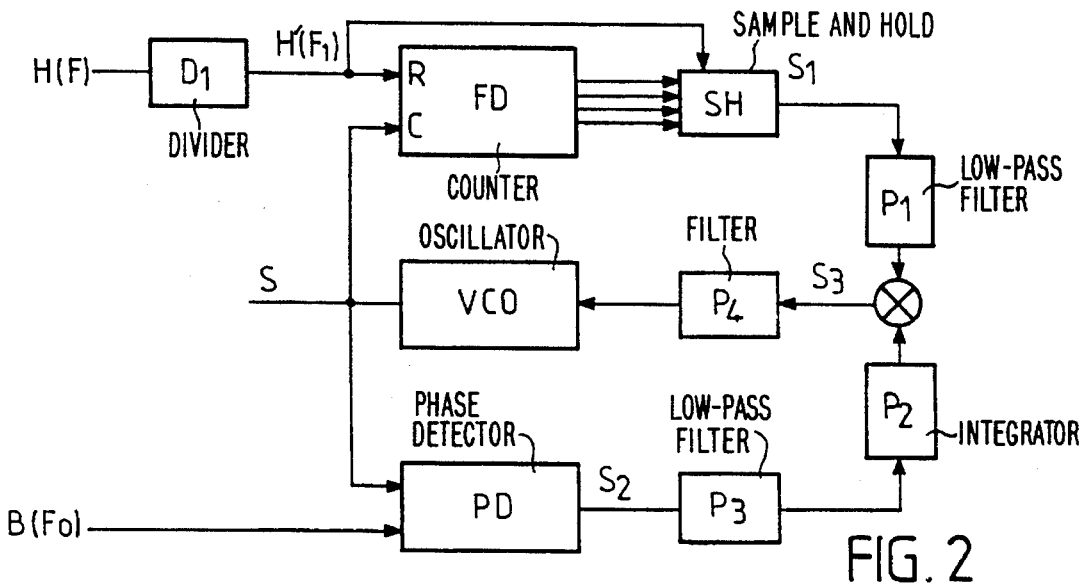
FIGS. 2 and 3 show two embodiments of a synchronization device in accordance with the invention.

In FIG. 2 a frequency detector FD has two inputs, of which one input is connected to the output of a divider $D_1$ whose input receives a continuous signal H, which is the clock signal having a nominal frequency F corresponding to the second clock frequency of continuous digital signal, the other input being connected to the output S of a local oscillator VCO to be synchronized. The dividing ratio of the divider 1 is selected so as to obtain a clock signal H' whose frequency is a sub-multiple $F_1$ of nominal frequency F, which is 4.3218 MHz for a signal in accordance with the CD standard, and to the frequency $F_o$ of the central frequency, in the present case 10.125 MHz. The frequency detector FD is a counter whose reset input R is connected to the output of the divider $D_1$, which in the present example divides by 2401 to yield a submultiple frequency $F_1$ of 1800 Hz, and whose count-down input C is connected to the output S of the oscillator VCO. For each clock pulse H' of the submultiple frequency $F_1$ the counter FD is reset to a given initial count immediately after sampling by a sample-and-hold circuit SH, whose signal input is connected to the output of the counter FD and whose synchronization input is connected to the output of the divider $D_1$. This method of processing a clock signal at the end of a count-down operation is well known. Thus, during this count-down operation the number of pulses delivered by the oscillator VCO in one period of the signal H' is counted. The initial count of the counter is selected in such a way that a count 0 is obtained when the oscillator VCO has reached its maximum possible frequency, allowance being made for the maximum error.

Figure 4:
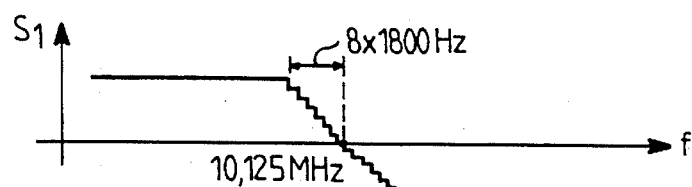
FIG. 4 the frequency response characteristic of the analog frequency-error signal.

The frequency Fo is equal to $pF_1$ (p being a positive integer), in the present example 5625. Moreover, the sample-and-hold circuit can be simplified if allowance is made for the error margin to be corrected, namely ±28 kHz as in the above example. This means that after counting down the output signal of the counter FD can have only a specific number of values between 2E, which is twice the aliquot part $\Delta Fo/F_1$, and 0, or in the present example between 15 and 0. Thus, when the initial count p+2E is reached, the counter FD will be reset before each count-down operation under control of the clock signal H'. It is then adequate to use a sample and hold circuit operating with the least significant bits of the error margin to be corrected, i.e. the four least significant bits in the present example, so that it is possible to use a four-bit digital-to-analog converter whose output level is offset by half the full-range value in order to obtain a signal 0 for $f=F_o$. The minimum frequency shift which can be detected is $F_1$. In order to ensure locking to the central frequency $F_o$ it is that $F_1$ should be smaller than $\Delta o$. This results in the step characteristic shown in FIG. 4 for the signal $S_1$ as a function of the frequency f of the signal S. The signal $S_1$ exhibits steps at regularly spaced levels for values of f between $Fo-EF_1$ and $Fo+EF_1$ and two well-defined levels outside this range. In the present example this results in $EF_1=8\times1800$ Hz=28.8 kHz.

The output of the sample-and-hold circuit SH is connected to the input of a low-pass filter $P_1$ for removing out the submultiple frequency component $F_1$, in the present example 1800 Hz, which filter is also used as loop filter. The phase-locked loop comprises a phase detector PD having one input connected to the output S of the voltage-controlled oscillator VCO and having another input which receives a signal B corresponding to the digital data bursts which are clocked at the frequency $F_o$ hereinafter referred to as the first clock frequency. The output $S_2$ of the phase detector PD is connected to the input of a low-pass filter $P_3$ (for example having a cut-off frequency of 20 kHz), whose output is connected to the input of an integrator $P_2$ which has its output connected to an input of an adder.

The response of the integrator $P_2$ may be:

$$P_2 = -\frac{1+p_2}{p_1}$$

where $_1$=58 µs and $_2$=336 µs and p=the Laplacian operator.

Said adder has its two inputs connected to the outputs of the filters $P_1$ and $P_2$. The output $S_3$ of the adder is connected to the voltage control input of the oscillator VCO, if necessary via a filter $P_4$ having two gain levels, the gain at very low frequencies being higher to provide compensation for thermal drift, in particular of the local clock, to be obtained. The response of this filter may be, for example:

$$P_4 = \frac{6}{5}\frac{1+p_5}{1+p_6}$$

where $_5$=6.8 ms $_6$=129 ms.

It will be appreciated that the correct operation of the synchronization device can be guaranteed only if the relationship between the first and the second frequencies is well-defined and is stable as a function of time. Indeed, any drift of one clock frequency relative to the other clock frequency will obviously disturb the correct operation by invalidating the measurements.

Figure 3:
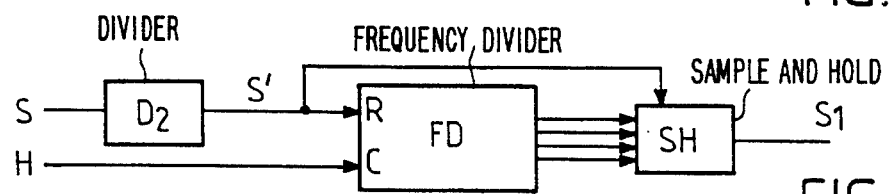

In FIG. 3 the signal H is applied directly to the count input C of the frequency divider FD. The signal S is divided by a divider $D_2$ to obtain a signal S' of a frequency $F_1$. In the present example the dividing ratio is 5625. In this arrangement the measurement is affected by counting down the periods of the 1800-Hz window signal by means of the clock H, whose frequency is stable by definition.

Consequently, the output of the phase detector varies by one bit each time that the frequency of S varies by $F'=F_1\times Fo/F$, i.e. 4218 Hz in the present example. F' is the minimum shift of the local clock frequency which can be detected and its value is dictated by the choice of $F_1$. In order to ensure locking to the central frequency $F_o$ it is necessary that $F'_1$ is smaller than $\Delta o$.

The output signal of the phase detector after counting down is logically inverted relative to the preceding situation, because the measurement is effected with a sign opposite to that in the preceding case, and the least significant bits are transferred to the inverse logic outputs of the counter. They are applied to the inputs of the sample-and-hold circuit SH, which is clocked by the signal S'. It is to be noted that the fact that this frequency varies slightly does not significantly affect the performance of the loop.

Figure 5:
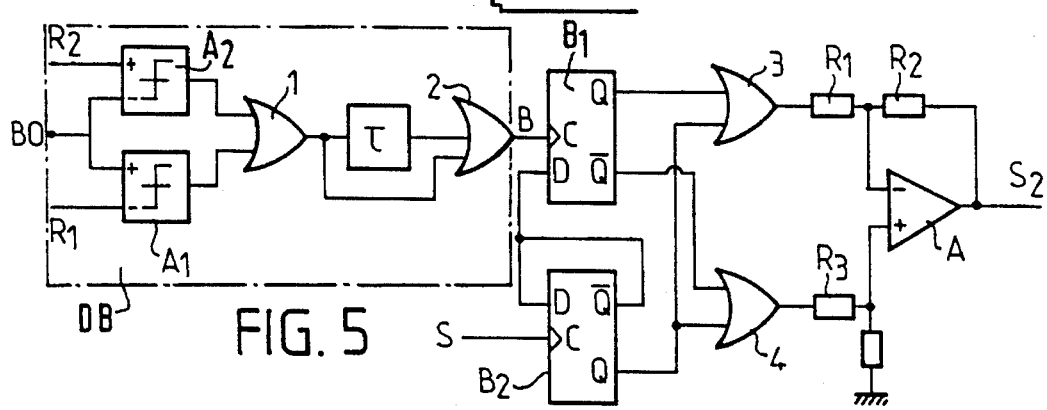
FIG. 5 shows an example of the phase detector in the device in accordance with the invention.

As is shown in FIG. 5, the signal B comprising the 1 and 0 pattern of the data bursts is derived from the signal BO read from a disc, which is effected by means of a duo-binary decoder DB of a known type, for example as described in the article "D2-MAC A new feature for digital TV" by H. Zibold and T. Fischer published in IEEE Transactions on Consumer Electronics, Vol. CE-32, no. 3, August 1986, pp. 274–282. It comprises two threshold discriminators $A_1$ and $A_2$ having thresholds $R_1$ and $R_2$ respectively, an exclusive-OR gate 1 and a shaping circuit comprising an exclusive-OR gate 2 and a delay circuit having a time constant in order to produce a signal B having a width which is adequate, for example 50 ns, to control the flip-flops.

The phase detector is constructed to generate a signal corresponding to a phase error exclusively when data bursts are present.

To this end two flip-flops $B_1$ and $B_2$ are arranged in parallel in such a way that when the signal B does not comprise a transition a flip-flop clocked by the signal S controls the operation and produces a signal having a 50% duty cycle, which corresponds to zero phase difference. In the interval between the data bursts the flip-flops $B_1$ and $B_2$ receive the chrominance signal and the luminance signal and in order to preclude the generation of erroneous phase signals the flip-flop $B_1$ is enabled only when data bursts are present, which is effected by means of the data window signal. As an alternative it is possible to utilize the data window signal in order to ensure that the signal B only comprises a transition during the data bursts, i.e. by eliminating the chrominance and the luminance signal in said signal. In that case the signal produced by the phase detector between the data bursts will exhibit a duty cycle of 50%, as a result of which the phase detector is disabled.

The signal B representing the data bursts is applied to the clock input C of a D-type flip-flop $B_1$. The signal S at the output of the oscillator VCO is applied to the clock input C of a D-type flip-flop $B_2$ whose data input D and inverting output $\bar{Q}$ are interconnected (arranged as a divide-by-two circuit) and are connected to the data input D of the flip-flop $D_1$. An exclusive-OR gate 3 has its inputs connected to the non-inverting output Q of the flip-flop $B_1$ and to the non-inverting output Q of the flip-flop $B_2$. An exclusive OR-gate 4 has one input connected to the inverting output $\overline{Q}$ of the flip-flop $B_1$ and has its other input to the non-inverting output of the flip-flop $B_2$. The outputs of the gates 3 and 4 are respectively connected to the inverting and the non-inverting input of an amplifier A via resistors $R_1$ and $R_3$ respectively. A feedback resistor $R_2$ is arranged between the output and the inverting input of the amplifier A. The output of the amplifier A supplies the analog phase-error signal $S_2$.

An advantage of said phase detector is that it enables a phase difference of 180° to be maintained between the clock signal S and the data signal B, which is desirable because the clock is used for sampling the data signal B.

The invention is not limited to the embodiments described or shown herein. For example in certain cases a record carrier may carry a continuous signal of the frequency $F_1$ <$\Delta$o which can be used in a device in accordance with the invention without further division. In that case the sub-multiple common to $F_o$ and $F_1$ is the frequency $F_1$. On the other hand, it will be appreciated that in practice the filters described herein will be used only if they provide an adequate useful effect. The invention can be implemented using, in particular, comparators and digital filters performing the same functions. The continuous signal may be an analog signal, in which case it may, for example, be converted into digital form in known manner.

Figure 6:
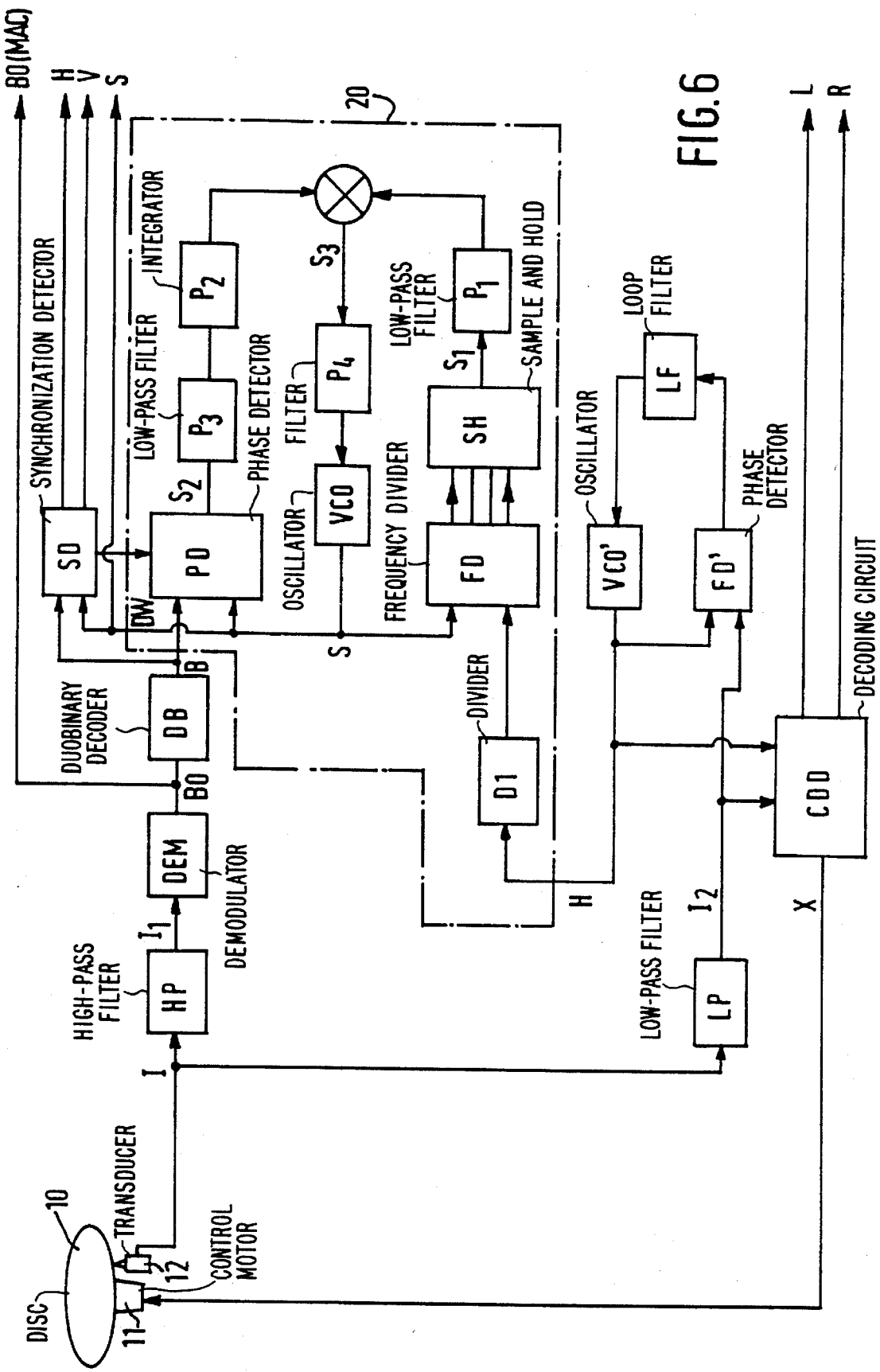
FIG. 6 shows an optical read apparatus comprising a synchronization device in accordance with the invention.

FIG. 6 shows a read apparatus for optical discs 10, comprising a device as described above.

Such a disc 10 constitutes a record carrier for an information signal comprising a video signal in accordance with the MAC standard and an audio signal in accordance with the CD standard. The frequency of the information signal is modulated by the MAC video signal and the width of the pulses of the information signal is modulated by the signal CD.

The information signal on the disc 10, which disc is driven by a control motor 11, is read by a transducer 12, for example an optical read head of a known type, which supplies a signal I. In order to separate its two components MAC and CD, the signal I is applied to the input of a high-pass filter HP, which supplies an output signal $I_1$ corresponding to the frequency-modulated MAC signal, and to the input of a low-pass filter LP, which supplies an output signal $I_2$ corresponding to the signal CD.

A decoding circuit CDD of a known type for the signal CD receives the signal $I_2$ at one input and a clock signal H supplied by a voltage-controlled oscillator VCO' at its other input. The signals H and $I_2$ are applied to the inputs of a phase detector FD' and the output signal of the filter, if necessary after filtering by a loop filter LF, is applied to the voltage-control input of the oscillator VCO'. The circuits VCO', FD' and F constitute a conventional phaselocked loop which supplies the clock signal H whose frequency is equal to the frequency of the data CD (4.32 MHz). The outputs of the decoding circuit CDD supply a control signal X for the motor 11 and audio signals L and R corresponding to two audio channels.

The signal $I_1$ is applied to the input of a demodulator DEM, whose output supplies a signal BO corresponding to the demodulated MAC signal.

The circuit elements within the chain-dotted frame bearing the reference numeral 20 correspond to those described in the FIGS. 2 and 5. Identical elements bear the same reference numerals. The signal H mentioned above constitutes the continuous reference signal. The signal H' is applied to the input of the divider $D_1$ and the signal BO is applied to the input of the duobinary decoder DB. The output signal S of the oscillator VCO and the output signal B of the decoder DB are applied to the inputs of a synchronization detector SD, which generates frame pulses V, line pulses H and data-window pulses DW. These data-window pulses are applied to an input of the phase detector PD to inhibit its operation in the absence of data bursts. The synchronization detector SD operates as follows. In the signal from the output B of the duobinary decoder DB it detects predetermined bit patterns indicating the start of the video frames. In response to such a detection a frame pulse V is generated. In order to generate the line pulses H and the data-window signals DW the synchronization detector SD comprises counters which count the pulses from the local clock (signal S) and which are reset to zero when the beginning of a frame (the signal V) is detected. The data window pulse DW indicates the presence of data bursts in the signal B. This data-window signal DW is applied to a control input of the flip-flop $B_1$ to enable this flip-flop $B_1$ if data bursts are present and to inhibit this flip-flop in the time intervals between these data bursts.

We claim:

1. A device for the synchronization of a local clock signal with an information signal comprising a plurality of time spaced digital data bursts having a first clock frequency, the frequency of the data bursts having a given relationship with the frequency of a reference signal having a second clock frequency, said device comprising:

a frequency comparator for producing at its output a frequency-error signal corresponding to a frequency shift of the local clock signal relative to a continuous signal derived from said reference signal, said frequency comparator comprising a counter having a countdown input for receiving said local clock signal and a control input for receiving a first signal derived from said second clock frequency, a phase comparator for producing at its output a phase-error signal which is representative of the phase difference between the local clock signal and the digital data of said information signal, and control means for controlling the frequency of the local clock signal as a function of said frequency-error and phase-error signals.

2. A device as claimed in claim 1, to wherein the frequency comparator is adapted to supply a frequency-error signal whose value is representative of the shift in time of the local clock signal relative to the second clock frequency during one period of a frequency which is a sub-multiple common to the first clock frequency and to the second clock frequency, said sub-multiple frequency defining the minimum shift of the local clock frequency which can be discriminated.

3. A read apparatus as claimed in claim 1, characterised in that the continuous signal is a digital audio signal and in that the decoding device is constructed to produce at least one separate analog audio signal at its output.

4. A device as claimed in claim 1, wherein the frequency comparator comprises a counter having a count-down input arranged to receive the continuous signal, and having a control input arranged to receive a second signal is derived from the local clock signal.

5. A device as claimed in claim 2, wherein at the beginning of each count-down cycle a count is obtained at its output in the case of a predetermined maximum frequency shift.

6. A device as claimed in claim 2, wherein the frequency comparator comprises a sample-and-hold circuit whose input is connected to the output of the counter and whose output supplies said frequency error signal.

7. A device as claimed in claim 1, further comprising a low-pass filter for filtering the frequency-error signal, which filter is arranged between the output of the frequency comparator and the input of the control means.

8. A device as claimed in to claim 1, wherein the phase comparator is connected to the output of a duobinary detector whose input is arranged to receive encoded signals corresponding to the data bursts, said detector producing said information signal at its output.

9. A device as claimed in to claim 1, wherein the phase comparator comprises a first flip-flop and a second flip-flop, the clock input of the second flip-flop being arranged to receive said local clock signal and the clock input of the first flip-flop being arranged to receive said information signal, which second flip-flop constitutes a divide-by-two circuit having an inverting output connected to the data input of the first flip-flop in such a way that the first flip-flop generates output signals whose duty cycle is representative of the phase difference to be measured.

10. A device as claimed in claim 9, to wherein for generating said phase-error signal, the phase comparator comprises a first and a second exclusive-OR gate, the inputs of the first gate being connected to the non-inverting output of the first flip-flop, and to the non-inverting output of the second flip-flop, and the inputs of the second gate being connected to an inverting output of the first flip-flop and to the non-inverting output of the second flip-flop, the outputs of the first and the second gate being connected respectively to the inverting input and the non-inverting input of an amplifier whose output constitutes the output of the phase comparator.

11. A device as claimed in claim 10, further comprising a low-pass filter for filtering the phase-error signal which filter has been arranged between the output of the phase comparator and the control means.

12. A device as claimed in claim 10, further comprising an integrator for integrating the phase-error signal, which integrator has been arranged between the output of the low-pass filter and the control means.

13. A device as claimed in claim 10, wherein a filter having two gain levels is arranged between the output of the control means and the frequency control input of the local clock which filter has a higher gain for very low frequencies so as to provide compensation for thermal drift.

14. A device as claimed in claim 10, wherein the phase comparator is arranged to receive a data-window signal corresponding to the time intervals in which the digital data bursts appear in the information signal in such a way that said it is operative only during said time intervals.

15. A device as claimed in claim 8, wherein the phase comparator comprises a first flip-flop and a second flip-flop, the clock input of the second flip-flop being arranged to receive said local clock signal and the clock input of the first flip-flop being arranged to receive said information signal, which second flip-flop constitutes a divide-by-two circuit having an inverting output connected to the data input of the first flip-flop in such a way that the first flip-flop generates output signals whose duty cycle is representative of the phase difference to be measured.

16. A read apparatus as claimed in claim 1, to wherein the information signal comprises information bursts between the digital data bursts, in that the apparatus comprises a synchronization detector constructed to receive the information signal and to produce at its output at least one data-window signal corresponding to the time intervals in which the data bursts are present, and inhibiting means constructed to receive said window signal and to render the phase detector insensitive to the information bursts.

17. A read apparatus as claimed in claim 16, wherein said inhibiting means comprise an input of the phase detector (PO) arranged to receive said window signal.

18. A read apparatus as claimed in claim 16 wherein the information bursts comprise video signals and in that the synchronization detector is adapted to separately produce a separate video line signal and video frame signal at its output.

19. A device as claimed in claim 7, wherein the phase comparator is connected to the output of a duobinary detector whose input is arranged to receive encoded signals corresponding to the data bursts, said detector producing said information signal at its output.

20. A read apparatus as claimed in claim 18, wherein the continuous signal is a digital audio signal and in that the decoding device is constructed to produce at least one separate analog audio signal at its output.

21. A device as claimed in claim 2, wherein the frequency comparator comprises a counter having a countdown input arranged to receive the continuous signal, and having a control input arranged to receive a second signal derived from the signal from the local clock.

22. A device as claimed in claim 4, wherein at the beginning of each count-down cycle a count is obtained at its output in the case of a predetermined maximum frequency shift.

23. A device as claimed in claim 5, wherein the frequency comparator comprises a sample-and-hold circuit whose input is connected to the output of the counter and whose output supplies said frequency error signal.

24. A device as claimed in claim 6, further comprising a low-pass filter for filtering the frequency-error signal, which filter is arranged between the output of the frequency comparator and the input of the control means.

25. A read apparatus as claimed in claim 17, wherein the information bursts comprise video signals and in that the synchronization detector is adapted to separately produce a separate video line signal and video frame signal at its output.

* * * * *